(12) United States Patent
Raichelgauz et al.

(10) Patent No.: US 9,953,032 B2
(45) Date of Patent: Apr. 24, 2018

(54) SYSTEM AND METHOD FOR CHARACTERIZATION OF MULTIMEDIA CONTENT SIGNALS USING CORES OF A NATURAL LIQUID ARCHITECTURE SYSTEM

(71) Applicant: Cortica, Ltd., Ramat Gan (IL)

(72) Inventors: Igal Raichelgauz, New-York, NY (US); Karina Odinaev, New-York, NY (US); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 333 days.

(21) Appl. No.: 14/302,487

(22) Filed: Jun. 12, 2014

(65) Prior Publication Data

US 2014/0297682 A1 Oct. 2, 2014

Related U.S. Application Data

(63) Continuation-in-part of application No. 13/602,858, filed on Sep. 4, 2012, now Pat. No. 8,868,619, which
(Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 17/30* (2006.01)

(52) U.S. Cl.
CPC .............................. *G06F 17/3002* (2013.01)

(58) Field of Classification Search
CPC .................................................. G06F 17/3002
See application file for complete search history.

(56) References Cited

U.S. PATENT DOCUMENTS 4,733,353 A   3/1988   Jaswa
4,932,645 A   6/1990   Schorey et al.
(Continued)

FOREIGN PATENT DOCUMENTS

WO        0231764              4/2002
WO        2003005242 A1        1/2003
(Continued)

OTHER PUBLICATIONS

Jianping Fan et al., "Concept-Oriented Indexing of Video Databases: Toward Semantic Sensitive Retrieval and Browsing", 2004, IEEE, pp. 1-19.*
(Continued)

*Primary Examiner* — Jared M Bibbee
(74) *Attorney, Agent, or Firm* — M&B IP Analysts, LLC

(57) ABSTRACT

A method and system for characterization of multimedia content inputs using cores of a natural liquid architecture are provided. The method comprises receiving at least one multimedia content signal; generating at least a signature respective of the multimedia content signal; matching the generated at least a signature respective of the multimedia content signal to at least a signature from a Signature Database (SDB); identifying a cluster respective of the generated at least a signature; and identifying in a Concept Database (CDB) a concept respective of the cluster.

17 Claims, 5 Drawing Sheets

Related U.S. Application Data is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603, 123 is a continuation-in-part of application No. 12/348,888, filed on Jan. 5, 2009, now Pat. No. 9,798,795, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009.

(60) Provisional application No. 61/833,932, filed on Jun. 12, 2013, provisional application No. 61/833,931, filed on Jun. 12, 2013.

(56) References Cited

U.S. PATENT DOCUMENTS

| | | |
|---|---|---|
| 4,972,363 A | 11/1990 | Nguyen et al. |
| 5,307,451 A | 4/1994 | Clark |
| 5,568,181 A | 10/1996 | Greenwood et al. |
| 5,745,678 A | 4/1998 | Herzberg et al. |
| 5,806,061 A | 9/1998 | Chaudhuri et al. |
| 5,852,435 A | 12/1998 | Vigneaux et al. |
| 5,870,754 A * | 2/1999 | Dimitrova ......... G06F 17/30799 |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,560,597 B1 | 5/2003 | Dhillon et al. |
| 6,594,699 B1 | 7/2003 | Sahai et al. |
| 6,601,026 B2 | 7/2003 | Appelt et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 * | 8/2004 | Foote ............... G06F 17/30814 707/E17.028 |
| 6,795,818 B1 | 9/2004 | Lee |
| 6,804,356 B1 | 10/2004 | Krishnamachari |
| 6,816,857 B1 | 11/2004 | Weissman et al. |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,043,473 B1 | 5/2006 | Rassool et al. |
| 7,124,149 B2 | 10/2006 | Smith et al. |
| 7,158,681 B2 | 1/2007 | Persiantsev |
| 7,199,798 B1 * | 4/2007 | Echigo ............. G06F 17/30259 345/473 |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,450,740 B2 | 11/2008 | Shah et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,694,318 B2 | 4/2010 | Eldering et al. |
| 7,836,054 B2 | 11/2010 | Kawai et al. |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,345,982 B2 | 1/2013 | Gokturk et al. |
| 8,548,828 B1 | 10/2013 | Longmire |

(56) References Cited

U.S. PATENT DOCUMENTS

| | | |
|---|---|---|
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 9,606,992 B2 | 3/2017 | Geisner et al. |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0019881 A1 | 2/2002 | Bokhari et al. |
| 2002/0038299 A1* | 3/2002 | Zernik ............. G06F 17/30017 |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1* | 11/2003 | Chung ................ G06F 17/2785 715/206 |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1* | 7/2004 | Sternberg .......... G06F 17/30247 725/136 |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1* | 1/2005 | Miedema ........... G06Q 30/0225 705/14.26 |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0238238 A1 | 10/2005 | Ku et al. |
| 2005/0245241 A1 | 11/2005 | Durand et al. |
| 2005/0262428 A1 | 11/2005 | Little et al. |
| 2005/0281439 A1 | 12/2005 | Lange |
| 2005/0289163 A1* | 12/2005 | Gordon ............. G06F 17/30038 |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1* | 3/2006 | Xiong ................ G06F 17/30799 725/52 |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1* | 10/2006 | Butterfield ........ G06F 17/30265 |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1* | 3/2007 | Wold ................ G06F 17/30758 717/100 |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |

(56) References Cited

U.S. PATENT DOCUMENTS

| | | |
|---|---|---|
| 2008/0046406 A1* | 2/2008 | Seide ............... G06F 17/30743 |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0037408 A1 | 2/2009 | Rodgers |
| 2009/0043637 A1 | 2/2009 | Eder |
| 2009/0043818 A1 | 2/2009 | Raichelgauz et al. |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0259687 A1 | 10/2009 | Mai et al. |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0268524 A1 | 10/2010 | Nath et al. |
| 2010/0306193 A1 | 12/2010 | Pereira et al. |
| 2010/0318493 A1* | 12/2010 | Wessling ........... G06F 17/30979 707/609 |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1* | 6/2012 | Jeong ............... G06F 17/30787 707/758 |
| 2012/0167133 A1 | 6/2012 | Carroll et al. |
| 2012/0185445 A1 | 7/2012 | Borden et al. |
| 2012/0197857 A1 | 8/2012 | Huang et al. |
| 2012/0239694 A1 | 9/2012 | Avner et al. |
| 2012/0299961 A1 | 11/2012 | Ramkumar et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1 | 3/2013 | Raichelgauz et al. |
| 2013/0086499 A1 | 4/2013 | Dyor et al. |
| 2013/0089248 A1 | 4/2013 | Remiszewski et al. |
| 2013/0104251 A1* | 4/2013 | Moore ................. G06F 21/602 726/30 |
| 2013/0159298 A1 | 6/2013 | Mason et al. |
| 2013/0173635 A1* | 7/2013 | Sanjeev ............ G06F 17/30825 707/748 |
| 2013/0226930 A1 | 8/2013 | Amgren et al. |
| 2013/0311924 A1 | 11/2013 | Denker et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2015/0154189 A1 | 6/2015 | Raichelgauz et al. |
| 2015/0286742 A1 | 10/2015 | Zhang et al. |
| 2015/0289022 A1 | 10/2015 | Gross |
| 2016/0026707 A1 | 1/2016 | Ong et al. |
| 2016/0239566 A1 | 8/2016 | Raichelgauz et al. |

FOREIGN PATENT DOCUMENTS

| | | | |
|---|---|---|---|
| WO | WO 03067467 A1 * | 8/2003 | ....... G06F 17/30743 |
| WO | 2004019527 A1 | 3/2004 | |
| WO | 2005027457 A1 | 3/2005 | |
| WO | 20070049282 | 5/2007 | |
| WO | 2014137337 A1 | 9/2014 | |
| WO | 2016040376 A1 | 3/2016 | |

OTHER PUBLICATIONS

Chuan-Yu Cho et al., "Efficient Motion-Vector-Based Video Search Using Query by Clip", 2004, IEEE, pp. 1-4.*

Wei-Te Li et al., "Exploring Visual and Motion Saliency for Automatic Video Object Extraction", Jul. 2013, IEEE, pp. 1-11.*

Ihab Al Kabary et al., "SportSense: Using Motion Queries to find Scenes in Sports Videos", Oct. 27, 2013, ACM, pp. 1-3.*

Shih-Fu Chang, "VideoQ: A Fully Automated Video Retrieval System Using Motion Sketches", 1998, IEEE, pp. 1-2.*

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005; Entire Document.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475

Foote, Jonathan et al., "Content-Based Retrieval of Music and Audio", 1997, Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Howlett et al., "A Multi-Computer Neural Network Architecture in a Virtual Sensor System Application", International Journal of Knowledge-based Intelligent Engineering Systems, 4 (2). pp. 86-93, 133N 1327-2314, Mar. 10, 2000.

International Search Authority: "Written Opinion of the International Searching Authority" (PCT Rule 43bis.1) including International Search Report for the related International Patent Application No. PCT/US2008/073852; dated Jan. 28, 2009; Entire Document.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.

(56) References Cited

OTHER PUBLICATIONS

International Search Report for the corresponding International Patent Application PCT/IL2006/001235; dated Nov. 2, 2008.
IPO Examination Report under Section 18(3) for corresponding UK application No. GB1001219.3, dated May 30, 2012.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251. German National Research Center for Information Technology.
Lin, C.; Chang, S.;, "Generating Robust Digital Signature for Image/Video Authentication,"Multimedia and Security Workshop at ACM Multimedia '98. Bristol, U.K. Sep. 1998, pp. 49-54.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine; a case study", Information Processing Letters, Amsterdam, NL, col. 95, No. 6, Sep. 30, 2005 (Sep. 30, 2005), pp. 521-528, XP005028093 ISSN: 0020-0190.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002; Entire Document.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Boari et al, "Adaptive Routing for Dynamic Applications in Massively Parallel Architectures", 1995 IEEE, Spring 1995.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Garcia, "Solving the Weighted Region Least Cost Path Problem Using Transputers", Naval Postgraduate School, Monterey, California, Dec. 1989.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Guo et al, "AdOn: An Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.20142359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publication.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

(56) References Cited

OTHER PUBLICATIONS

Li, et al., "Matching Commercial Clips from TV Streams Using a Unique, Robust and Compact Signature," Proceedings of the Digital Imaging Computing: Techniques and Applications, Feb. 2005, vol. 0/7695-2467, Australia.
Lin, et al., "Robust Digital Signature for Multimedia Authentication: A Summary", IEEE Circuits and Systems Magazine, 4th Quarter 2003, pp. 23-26.
May et al., "The Transputer", Springer-Verlag, Berlin Heidelberg, 1989, teaches multiprocessing system.
Vailaya, et al., "Content-Based Hierarchical Classification of Vacation Images," I.E.E.E. Multimedia Computing and Systems, vol. 1, 1999, East Lansing, MI, pp. 518-523.
Vallet, et al., "Personalized Content Retrieval in Context Using Ontological Knowledge," IEEE Transactions on circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Brecheisen, et al., "Hierarchical Genre Classification for Large Music Collections", ICME 2006, pp. 1385-1388.
Gomes et al., "Audio Watermaking and Fingerprinting: For Which Applications?" University of Rene Descartes, Paris, France, 2003.
Nam, et al., "Audio Visual Content-Based Violent Scene Characterization", Department of Electrical and Computer Engineering, Minneapolis, MN, 1998, pp. 353-357.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.
The International Search Report and the Written Opinion for PCT/US2017/015831, ISA/RU, Moscow, Russia, dated Apr. 20, 2017.
Hua, et al., Robust Video Signature Based on Ordinal Measure, Image Processing, 2004. 2004 International Conference on Image Processing (ICIP), vol. 1, IEEE, pp. 685-688, 2004.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Schneider, et. al., "A Robust Content Based Digital Signature for Image Authentication", Proc. ICIP 1996, Laussane, Switzerland, Oct. 1996, pp. 227-230.
Yanagawa, et al., "Columbia University's Baseline Detectors for 374 LSCOM Semantic Visual Concepts." Columbia University Advent technical report, 2007, pp. 222-2006-8.
Zou, et al., "A Content-Based Image Authentication System with Lossless Data Hiding", ICME 2003, pp. 213-216.
Hogue, "Tree Pattern Inference and Matching for Wrapper Induction on the World Wide Web", Master's Thesis, Massachusetts Institute of Technology, 2004, pp. 1-106.

\* cited by examiner

US 9,953,032 B2

SYSTEM AND METHOD FOR CHARACTERIZATION OF MULTIMEDIA CONTENT SIGNALS USING CORES OF A NATURAL LIQUID ARCHITECTURE SYSTEM

CROSS-REFERENCE TO RELATED APPLICATIONS

This application claims the benefit of U.S. Provisional Application No. 61/833,932 and U.S. Provisional Application No. 61/833,931 both filed on Jun. 12, 2013. This application is also a continuation-in-part of U.S. patent application Ser. No. 13/602,858, filed on Sep. 4, 2012, now pending. The application Ser. No. 13/602,858 is a continuation of U.S. patent application Ser. No. 12/603,123, filed on Oct. 21, 2009, now U.S. Pat. No. 8,266,185. The application Ser. No. 12/603,123 is a continuation-in-part of:

(1) U.S. patent application Ser. No. 12/084,150, having a filing date of Apr. 7, 2009, now U.S. Pat. No. 8,655,801, which is the National Stage of International Application No. PCT/IL2006/001235, filed Oct. 26, 2006, which claims foreign priority from Israeli Application No. 171577, filed Oct. 26, 2005, and Israeli Application No. 173409, filed on Jan. 29, 2006;

(2) U.S. patent application Ser. No. 12/195,863, filed Aug. 21, 2008, now U.S. Pat. No. 8,326,775, which claims priority under 35 U.S.C. 119 from Israeli Application No. 185414, filed Aug. 21, 2007. The application Ser. No. 12/195,863 is also a continuation-in-part of the above-referenced U.S. patent application Ser. No. 12/084,150;

(3) U.S. patent application Ser. No. 12/348,888, filed Jan. 5, 2009, now pending, which is a CIP of the above-referenced U.S. patent application Ser. No. 12/084,150 and the above-referenced U.S. patent application Ser. No. 12/195,863; and (4) U.S. patent application Ser. No. 12/538,495, filed Aug. 10, 2009, now U.S. Pat. No. 8,312,031, which is a continuation-in-part of the above-referenced U.S. patent application Ser. No. 12/084,150, the above-referenced U.S. patent application Ser. No. 12/195,863, and the above-referenced U.S. patent application Ser. No. 12/348,888.

All of the applications referenced above are hereby incorporated by reference.

TECHNICAL FIELD

The present invention relates generally to pattern recognition and, more particularly, to pattern recognition in multimedia content.

BACKGROUND

Sound and image files, as well as other files featuring multimedia content, may be indexed by their titles. Unfortunately, if a multimedia file is simply an embedded or linked multimedia file on a Web page, there may be no additional information about it. The multimedia files may have some descriptive information included, such as the source. Other metadata can be included in multimedia files, but such inclusion requires more effort on the part of the content producer and, as in the case of images, this may be incomplete or insufficient, to say the least.

Full indexing of the content of sound files generally requires having a transcript of the session in a computer-readable text format to enable text-indexing. With voice recognition software, some automated indexing of audio files is possible and has been successfully used. However, it is widely known that such transcripts rarely match what was spoken exactly. The difficulty is compounded if the spoken words are sung and the search is for the song in a specific tune, or a search for a tune regardless of the words. Analysis of audio signals is desirable for a wide variety of reasons such as speaker recognition, voice command recognition, dictation, instrument or song identification, and the like.

Similarly, video analysis is a growing field alongside image recognition. One application within the field of video analysis is performing a search on a plurality of videos, thereby enabling a user to find a video containing a specific scene or action that the user wishes to view. For example, a user may wish to see a video of a person slipping on a banana peel. However, existing solutions typically only permit a user to find such video content if the video is associated with metadata identifying its content. Metadata associated with the video clips typically describe attributes of the clip, such as length, format type, source and so on. The metadata does not describe the contents of the clip and in particular the contents of each scene.

It would therefore be advantageous to have a system capable of identifying multimedia content elements according to the content contained therein.

SUMMARY

Certain embodiments disclosed herein include a method and system for characterization of multimedia content inputs using cores of a natural liquid architecture. The method comprises receiving at least one multimedia content signal; generating at least a signature respective of the multimedia content signal; matching the generated at least a signature respective of the multimedia content signal to at least a signature from a Signature Database (SDB); identifying a cluster respective of the generated at least a signature; and identifying in a Concept Database (CDB) a concept respective of the cluster.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
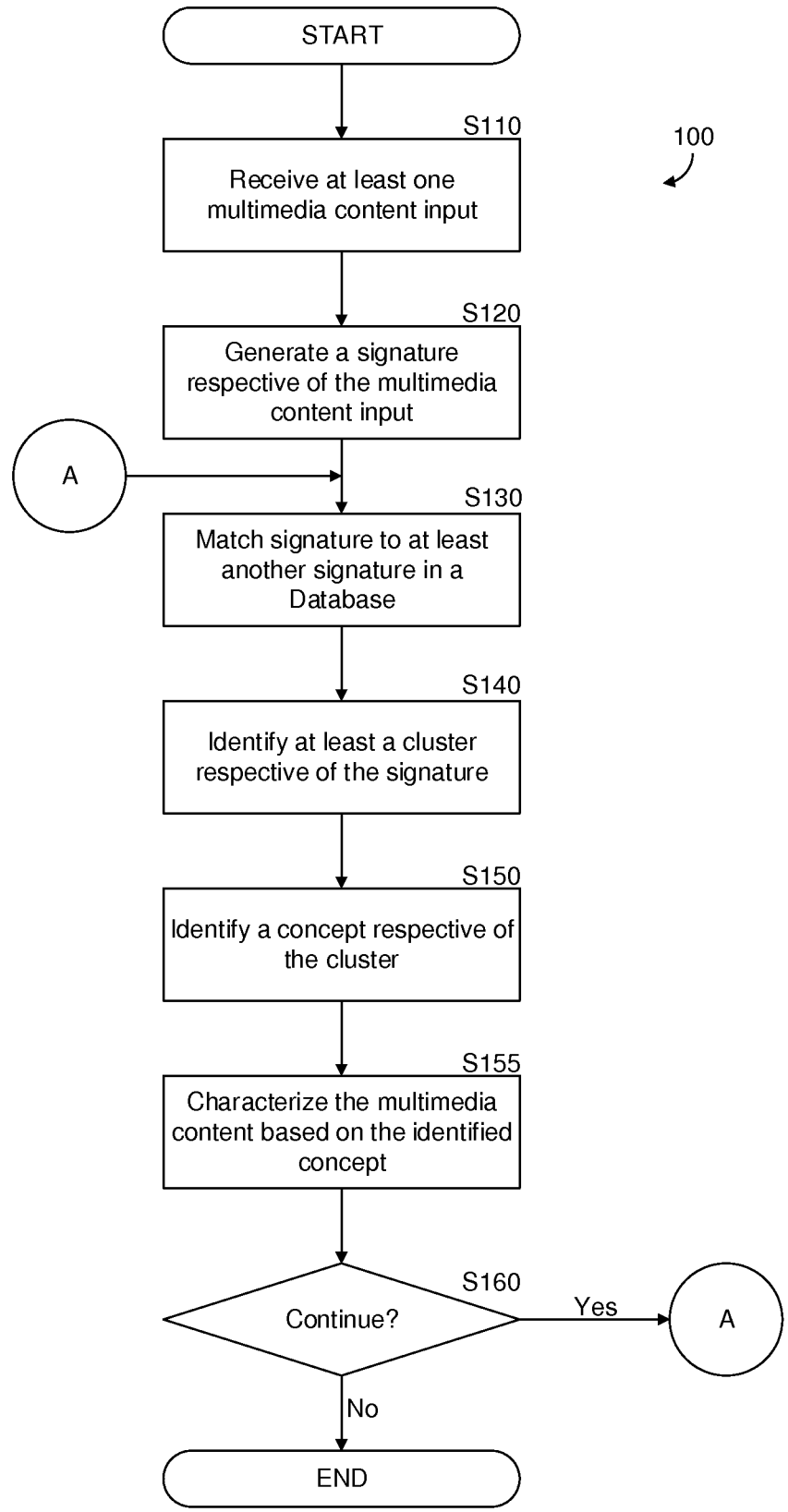
FIG. 1 is a flowchart illustrating a method for characterization of multimedia content using cores of a natural liquid architecture according to an embodiment.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for identification and classification of multimedia content signals. At least one multimedia content signal input is received. Signatures are generated and a cluster of signatures respective of the at least one multimedia content signal is identified. Signatures may be generated respective of, but not limited to, image or audio portions of a multimedia content. Signatures having at least a partial match form a cluster. The match is referred to as a concept. The concept is then matched to a database that include a plurality of concepts and the identification and classification of the at least one multimedia content signal are performed respective of the match.

FIG. 1 is a non-limiting exemplary flowchart 100 illustrating a method for identification and classification of multimedia content signals using cores of a natural liquid architecture according to an embodiment. At least one multimedia content input is received in S110. The multimedia content input may be a digital representation of a video signal, a digital representation of an audio signal, a digital representation of any multimedia content signal, a direct feed from one or more camera devices, a direct feed from one or more microphone devices, a direct feed from one or more devices capable of capturing and/or storing multimedia content, or the like. In an embodiment, a plurality of multimedia content inputs is received respective of a single source. In another exemplary embodiment, a plurality of multimedia content inputs is received respective of a sound, scene, or event comprising different angles, different spectrums, different musical parameters, different lengths, or any combination thereof.

In S120, a measurement respective of the multimedia content input is generated to produce at least a signature. The measurement may be, for example, respective of an entire multimedia content input, a part of a multimedia content input, combinations of entire or partial multimedia inputs, and the like. A signature may be generated respective of an audio portion of a video signal, an image portion of a video signal, an audio signal, or any combinations thereof. A generated signature may be stored in a memory or a database for storing signatures. Generation of signatures according to various disclosed embodiments is described further in the above-referenced U.S. Pat. No. 8,326,775, assigned to common assignee.

Signature generation may be conducted by a system implementing a computational architecture (hereinafter referred to as "the Architecture") as described in U.S. Pat. No. 8,655,801, referenced above, assigned to common assignee. Generally, the Architecture includes a large ensemble of randomly and independently generated heterogeneous computational cores, mapping data-segments onto a high-dimensional space in parallel and generating compact signatures for classes of interest. The process of signature generation is discussed further herein below with respect to FIGS. 3 and 4.

In S130, a generated signature is matched to at least another signature from, e.g., a signature database (SDB). A generated signature may have no match to a signature from a SDB. Alternatively, a generated signature may have one or more partial or full matches to one or more signatures from the SDB. A group of signatures having one or more matches forms a cluster of signatures. Signature matching is discussed in more detail herein below with respect to FIGS. 3 and 4.

In S140, a cluster is identified respective of the generated signature. The at least one cluster may be identified respective of the generated signature based on, e.g., a portion of a signature that is common to all signatures in the cluster and to the generated signature. The match that is common to all signatures in the cluster is a concept, as discussed further herein below with respect to S150.

Clusters initially contain a single multimedia data element and exist as an entry in a diagonal two-dimensional matrix. To cluster signatures, matching is performed between each cluster in the matrix and the other clusters, and results of matching are stored in each cluster's respective row in the matrix. Clusters that, for example, demonstrate matching above a predefined threshold may be utilized to form new clusters. Clustering of signatures is described in more detail in U.S. Pat. No. 8,386,400, assigned to the common assignee and is hereby incorporated by reference for all it contains.

The clustering process may map a certain content-universe onto a hierarchical structure of clusters. The content-elements of the content-universe are mapped to signatures as appropriate. The signatures of all of the content-elements are matched to each other and, consequently, such matching generates an inter-match matrix. Generation of the inter-match matrix leads to a set of clusters. This results in a highly compressed representation of the content-universe. Content-universe mapping is discussed in more detail in U.S. Pat. No. 8,266,185 assigned to common assignee, which is hereby incorporated by reference for all that it contains.

In S150, at least one concept is identified respective of the cluster. The match common to all the signatures of an identified cluster is a concept or a concept structure. Concepts may be identified based on previously generated concepts, or based on concepts generated in response to identification of clusters. In an embodiment, concepts may also be identified based on an inter-match matrix. Identification of concepts respective of clusters is described in more detail herein below with respect to FIG. 5.

In S155, the at least one multimedia content input is characterized based on the at least one concept identified in S150. The identified concept is a collection of signatures representing elements of the unstructured data and metadata describing the concept. As a non-limiting example, a 'Superman concept' is a signature reduced cluster of signatures describing elements (such as multimedia elements) related to, e.g., a Superman cartoon: a set of metadata representing textual representation of the Superman concept. Therefore, the concept can provide a unique identification of the multimedia content input. For example, such an input may be an image of a man wearing a belt with a Superman icon, wherein the image is taken from a video clip commercial for a beer brand. The image will be associated with the Superman concept and the metadata of that concept will describe the belt in the input image. In comparison to prior art solutions, the metadata will identify, for example, the beer brand, length, format type and possibly the name of the beer brand. The prior art metadata does not provide a description at the resolution of each scene or image in the commercial's video clip.

In another non-limiting example, a "folk rock" concept is a signature reduced cluster of signatures describing elements (such as multimedia elements) related to, for example, folk rock music: a set of metadata representing textual representation of the folk rock concept. Therefore, the concept can provide a unique identification of the multimedia content input. For example, such an input may be a digital audio file of Bob Dylan performing "All Along the Watchtower." The audio is in the example associated with the folk rock concept and the metadata of that concept describes clear vocal harmonies and electric instruments used therein.

In comparison to prior art solutions, the metadata identifies, for example, the singer, length, format type and possibly the name of the song. The prior art metadata does not provide a description at the resolution of each audio segment, such as identification of musical instruments, guitar solo, additional vocals, etc. In a similar non-limiting example, the song "Money for Nothing", as performed by British rock band "Dire Straits" features English musician Gordon Sumner (a.k.a. Sting) in a cameo part. Typically, in prior art solutions, this would not be included in the metadata for the audio file of the song. In the described embodiments, a concept of "Sting" would be associated with the song "Money for Nothing", in addition to other concepts which may be determined.

In one embodiment, S155 further includes classification of the signals based on the identified concepts. For example, two concepts can be identified for the belt with the Superman icon: Superman Cartoon and Fashion accessories, thereby the input image will be classified for these two entities.

In S160, it is checked whether additional matching will be performed with signatures from the SDB. If so, execution continues with S130; otherwise, execution terminates.

As a non-limiting example, a multimedia content signal containing multiple multimedia content elements is received. In this example, the multimedia content signal is a video featuring multimedia content elements showing a baby panda at the zoo in the foreground, wherein a man slipping on a banana peel may be seen in the background. In this example, metadata associated with the video only indicates information related to the baby panda. A signature is generated respective of each multimedia content element (the panda, the zoo environment, the banana peel, and the man.

Each generated signature is matched to at least another signature in a database. As a result, at least one cluster is identified respective of each generated signature. A concept is identified respective of each cluster. In this example, such concepts may be an "animal," a "panda," the "zoo," a "banana peel," a "man," and the event of "slipping." Based on these identified concepts, the video may be characterized as, e.g., a "baby panda at the zoo with a man slipping on a banana peel." This characterization may be useful for, but is not limited to, allowing users searching for videos featuring a man slipping on a banana peel to find this video when the metadata would not characterize it as such.

Figure 2:
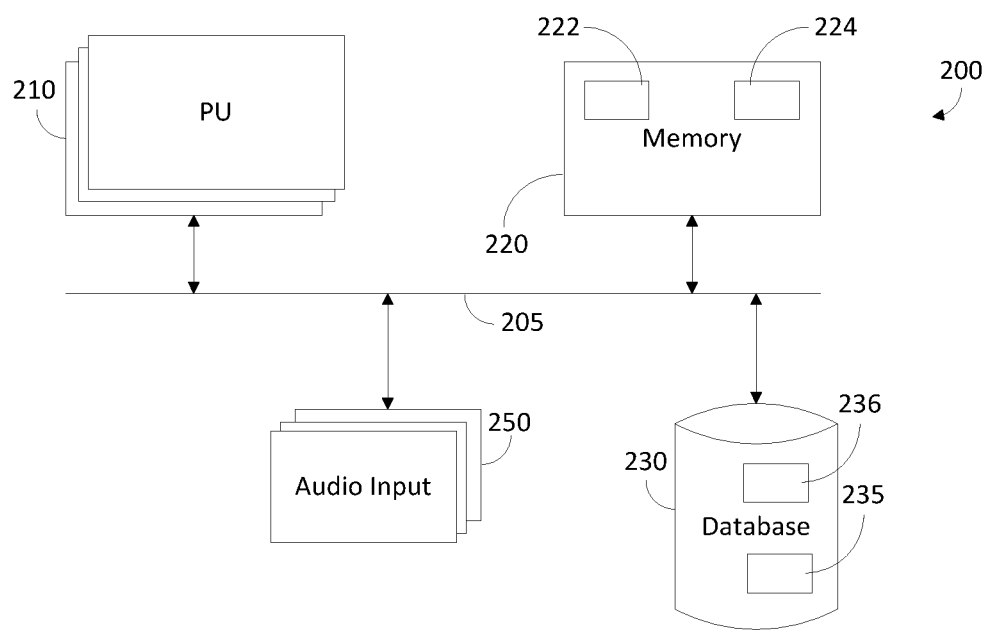
FIG. 2 is a schematic block diagram illustrating a system for characterization of multimedia content using cores of a natural liquid architecture implemented according to an embodiment.

FIG. 2 is an exemplary and non-limiting schematic illustration of a system 200 for classification of multimedia content inputs using cores of a natural liquid architecture implemented according to an embodiment. The system 200 comprises at least one processing element 210. Processing element 210 may be, for example, a processing unit (PU). In various other embodiments, a plurality of PUs may be used. The at least one PU is coupled via a bus 205 to a memory 220. In an embodiment, the memory 220 further comprises a memory portion 222 containing instructions that, when executed by the processing element 210, performs the method described in more detail herein. The memory may be further used as a working scratch pad for the processing element 210, a temporary storage, and so on. The memory may be a volatile memory such as, but not limited to random access memory (RAM), or a non-volatile memory (NVM) such as, but not limited to, Flash memory.

The memory 220 may further comprise memory portion 224 containing one or more match scores between a cluster and a concept. Memory portion 224 or a secondary memory (not shown) may contain a measurement respective of a multimedia content signal.

The processing element 210 may further be coupled to at least one multimedia content input 250. A plurality of multimedia content inputs may be used to represent different signals, a single signal received from a plurality of locations, or any combination thereof. The processing element 210 may be further coupled to a database 230.

The database 230 is configured to maintain a storage portion 235 containing a plurality of concepts respective of a plurality of languages which form a Concept Database (CDB). The database 230 may also further comprise storage portion 236 containing at least a signature which forms a signature database (SDB). The concept signals may be used to determine a match score between an identified cluster and one or more concepts, or to determine a match score between a signal and one or more concepts.

In an embodiment, the processing element 210 is configured to run or to include a plurality of computational cores that formed the Architecture. As demonstrated herein the Architecture is a large ensemble of randomly and independently generated heterogeneous computational cores, mapping data-segments onto a high-dimensional space in parallel and generating compact signatures for classes of interest. In this embodiment, the processing element 210 can be utilized to generate signatures for multimedia content input and such signatures are stored in the database 230. In another embodiment, the processing element 210 can create concepts respective of generates and compare between concepts either saved locally in the database 230 or in external source.

The processing element 210 is also configured to characterize and classify the multimedia content input based on the identified concept. Specifically, as described above, the characterization of the input is based in part on the metadata associated with the identified concept. The multimedia content input may be a scene from a video clip, an image from a video clip, an audio signal (which may be a portion of a sound track, recorded conversation, a sound sample, a recorded song, etc.).

In an embodiment, the system is connected to a deep-content-classification (DCC) system (not shown). The DCC system is configured to generate concepts, perform inter-matching concepts and find one or more concepts that match at least one generated signature. An exemplary DCC system that can be utilized is disclosed in more detail in U.S. Pat. No. 8,266,185, assigned to common assignee, which is hereby incorporated by reference for all that it contains.

In an embodiment, the system 200 is configured to query the DCC system using a generated signature to find at least one matching concept. In addition, the system 200 can query the DCC system to find a match between two concepts generated by the system to find a matching concept to a concept generated by the system. Matching concepts can be found using a signature representing the concept.

To demonstrate an example of a signature generation process, it is assumed, merely for the sake of simplicity and without limitation on the generality of the disclosed embodiments, that the signatures are based on a single multimedia content frame or a sample, leading to certain simplification of the computational cores generation. The Matching System is extensible for signatures generation capturing the dynamics in-between the frames.

Figure 3:
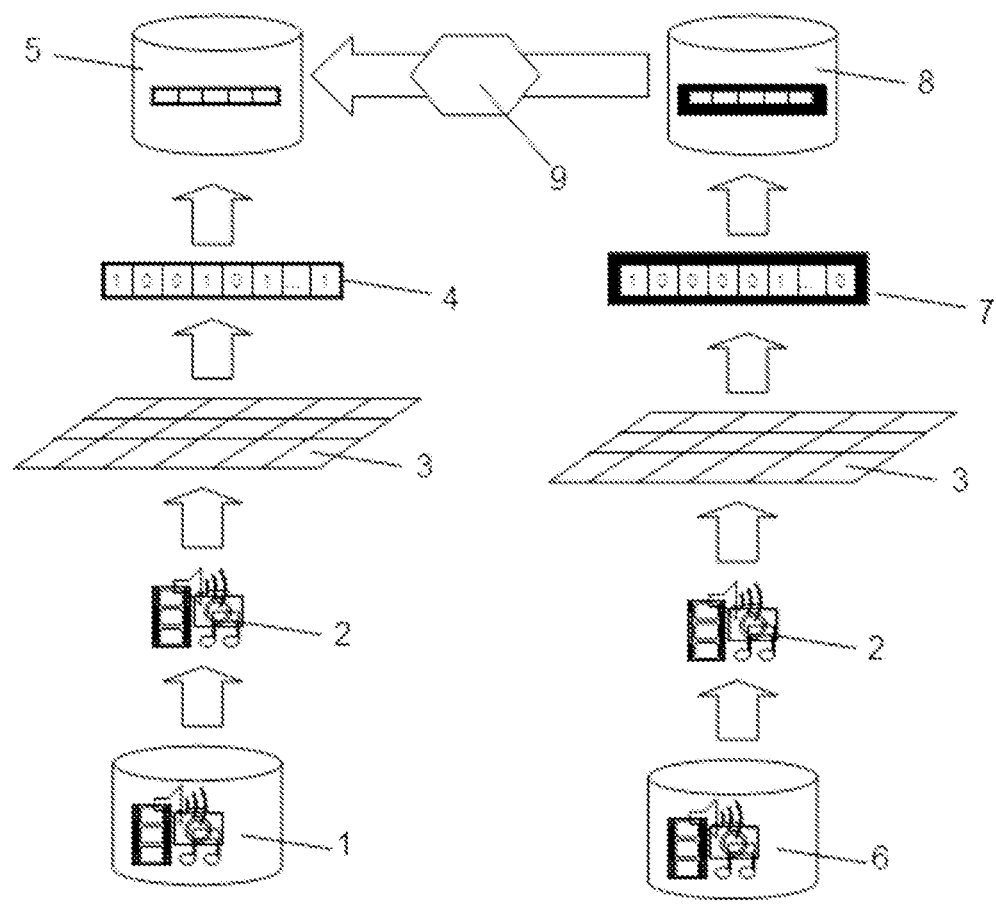
FIG. 3 is a block diagram depicting the basic flow of information in a large-scale multimedia content matching system.
Figure 4:
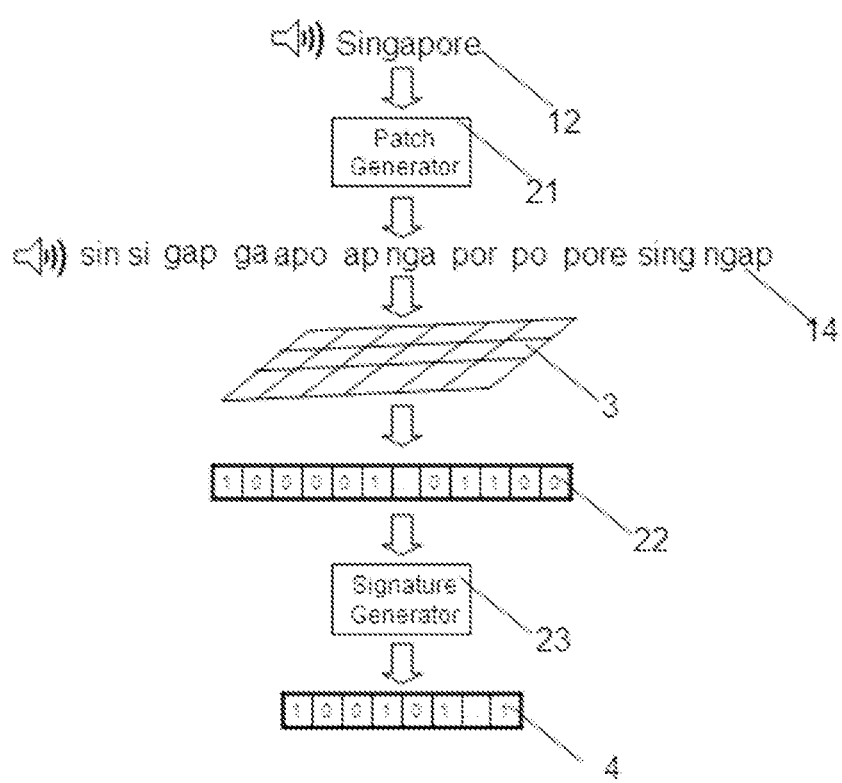
FIG. 4 is a diagram showing the flow of patches generation, response vector generation, and signature generation in a large-scale speech-to-text system.

FIGS. 3 and 4 illustrate the generation of signatures for the multimedia content elements by a signature generator system according to one embodiment. An exemplary high-level description of the process for large scale matching is depicted in FIG. 3. In this non-limiting example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

The Signatures' generation process will now be described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of a server and a signature generation system. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \Theta(V_i - Th_x)$$

where, $\Theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where x is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature (ThS) and Robust Signature (Th$_{RS}$) are set apart, after optimization, according to at least one or more of the following criteria:

1: For:

$$V_i > Th_{RS}$$

$$1-p(V>Th_s)-1-(1-\epsilon)^l \ll 1$$

i.e., given that l nodes (cores) constitute a Robust Signature of a certain image l, the probability that not all of these l nodes will belong to the Signature of same, but noisy image, $\tilde{l}$ is sufficiently low (according to a system's specified accuracy).

2:

$$p(V_i>Th_{RS}) \approx l/L$$

i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. Detailed description of the Signature generation is discussed in more detail in the co-pending patent applications of which this patent application is a continuation-in-part, which are hereby incorporated by reference.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in the above-referenced U.S. Pat. No. 8,655,801, assigned to the common assignee, which is hereby incorporated by reference for all that it contains.

Figure 5:
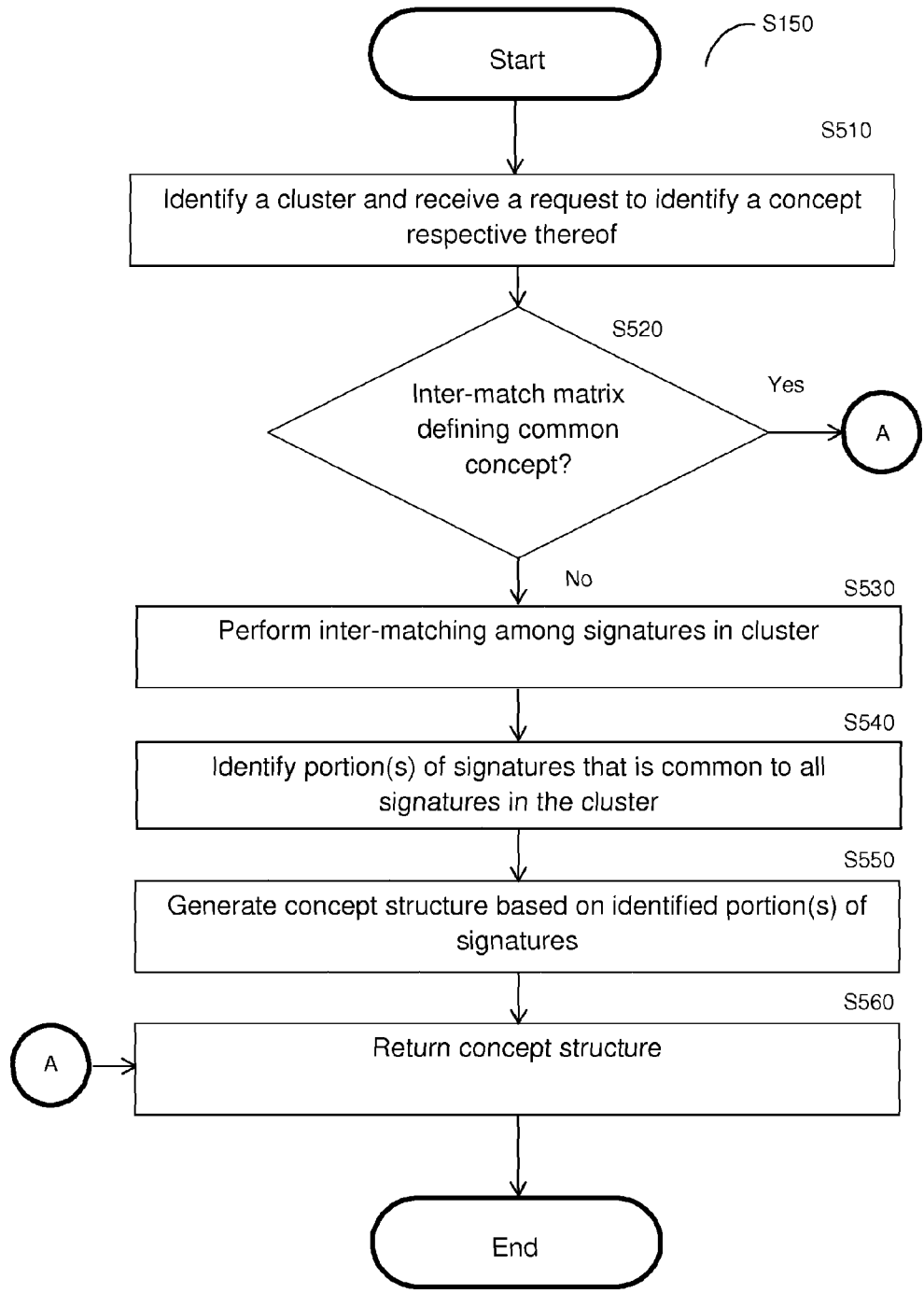
FIG. 5 is a flowchart showing identification of a concept based on signatures in a cluster according to an embodiment.

FIG. 5 is an exemplary and non-limiting flowchart illustrating S150 of identification of a concept based on signatures in a cluster according to one. In S510, a cluster is identified and a request to identify a concept respective of the cluster is received. In optional step S520, it is checked whether there is an existing inter-match matrix defining a common concept structure among signatures in the cluster. If so, execution continues with S560; otherwise, execution continues with S530.

In S530, inter-matching is performed among signatures in the identified cluster. In S540, based on results of the inter-matching, a portion or portions of the signatures of the cluster that is common to all signatures in the cluster is identified. In an embodiment, if more than one portion is identified, such identified portions may be concatenated to form a single concatenated portion of signatures.

In another embodiment, if no suitable portion of signatures is common to all signatures in the cluster, a suitable portion of signatures that is present in the highest number of signatures possible may be identified instead. Portions of signatures may be deemed unsuitable if, for example, they are not long enough or do not receive a matching score above a pre-defined threshold. In a further embodiment, upon identification of a suitable portion of signature that is not present in all signatures in the cluster, a message may be returned indicating as such. In another further embodiment, signatures that do not include the suitable portion may be excluded from the cluster.

In S550, a concept structure representing commonality among signatures in the cluster is generated based on identified portions of signatures. This concept structure may include a single portion of a signature, multiple portions of signatures, a concatenated portion of signatures, multiple concatenated portions of signatures, combinations thereof, and the like. In S560, the generated or defined concept structure is returned.

As a non-limiting example, a cluster including several generated signatures is identified. Upon checking whether there is a pre-existing inter-match matrix for the cluster defining a common concept, it is determined that such a matrix exists. Upon determining that such a matrix exists, the concept structure defined in the matrix is returned.

As another non-limiting example, a cluster including several signatures generated based on images of a baseball, a tennis ball, a basketball, and a soccer ball, respectively, is identified. In this example, no inter-match matrix exists at the time of identification. Upon determination that no inter-match matrix exists, inter-matching is performed among all of the signatures in the cluster. The inter-matching process yields certain portions of the signatures that demonstrate matching above a pre-defined threshold. Based on the inter-matching, a portion of each signature identifying the shape of each ball and that each ball is related to a sport is identified as common among all signatures. Based on this identified common signature portion, a concept structure is generated. In this example, the concept structure may be "sports balls." The concept structure of "sports balls" is then returned.

As yet another non-limiting example, a cluster of signatures that were generated based on an image of monkey next to a bowl of fruit is determined. The cluster is identified and no inter-match matrix already exists. Thus, inter-matching is performed among all signatures in the cluster. In this example, if no concept is common among all signatures in the cluster, the concept that is present in the highest number of signatures is identified. Thus, the portion of the signatures of the fruit in the bowl that identifies each item as a piece of fruit is determined to be the portion of a signature that is common to the highest number of signatures. A concept structure representing the concept of "fruit" is generated and returned.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for characterization of multimedia content inputs using a plurality of computational cores of a natural liquid architecture, comprising:
   a processing element, wherein the processing element further comprises an ensemble of randomly and independently generated heterogeneous computational cores;
   a signature data base (SDB) for storing at least one signature for a multimedia content input and a concept database (CDB) for storing at least one concept, wherein the concept includes a collection of signatures, each signature representing a multimedia content input, and metadata describing the concept;
   an interface coupled to the processing element, wherein the interface is configured to receive at least one multimedia content input; and
   a memory communicatively connected to the processing element, wherein the memory contains instructions that, when executed by the processing element, configure the system to:
   receive a multimedia content input;
   generate a signature respective of the multimedia content input;
   match the signature to at least one signature from the SDB;
   identify a cluster respective of the generated signatures;
   identify at least one concept respective of the cluster in the CDB; and
   characterize the multimedia content input based in part on metadata describing the at least one identified concept.

2. The system of claim 1, wherein the at least one multimedia content input is at least one of: a digital representation of an audio signal, and a direct feed from at least one microphone device.

3. The system of claim 2, wherein a plurality of audio signals is received respective of a single source.

4. The system of claim 2, wherein the signature is generated respective of the entire audio signal, a part of the audio signal, or a combination of entire or partial audio signals.

5. The system of claim 1, wherein the at least one multimedia content input is at least one of: a digital representation of a video signal, and a direct feed from at least one camera device.

6. The system of claim 5, wherein a plurality of video signals is received respective of a single source.

7. The system of claim 5, wherein the signature is generated respective of the entire video signal, a part of the video signal, or a combination of entire or partial video signal.

8. The system of claim 1, wherein the signature is either partially matched or fully matched to at least one signature from the SDB.

9. A method for characterization of multimedia content inputs using cores of a natural liquid architecture, comprising:
    receiving at least one multimedia content input;
    generating at least a signature respective of the multimedia content input, wherein the at least a signature is generated by an ensemble of randomly and independently generated heterogeneous computational cores;
    matching the generated at least a signature respective of the multimedia content input to at least a signature from a Signature Database;
    identifying a cluster respective of the generated at least a signature; and
    identifying in a Concept Database (CDB) a concept respective of the cluster, wherein the concept includes a collection of signatures, each signature representing an a multimedia content input, and metadata describing the concept; and
    characterizing the multimedia content input based in part on metadata describing the at least one identified concept.

10. The method of claim 9, wherein the at least one multimedia content input is at least one of: a digital representation of an audio signal, and a direct feed from at least one microphone device.

11. The method of claim 10, wherein a plurality of audio signals is received respective of a single source.

12. The method of claim 10, wherein the signature is generated respective of the entire audio signal, a part of the audio signal, or a combination of entire or partial audio signal.

13. The method of claim 9, wherein the at least one multimedia content input is at least one of: a digital representation of a video signal, and a direct feed from at least one camera device.

14. The method of claim 13, wherein a plurality of video signals is received respective of a single source.

15. The method of claim 13, wherein the signature is generated respective of the entire video signal, a part of the video signal, or a combination of entire or partial video signal.

16. The method of claim 9, wherein the signature is either partially matched or fully matched to at least one signature from the SDB.

17. A non-transitory computer readable medium having stored thereon instructions for causing a processing circuitry to execute a process, the process comprises:
    receiving at least one multimedia content input;
    generating at least a signature respective of the multimedia content input, wherein the at least a signature is generated by an ensemble of randomly and independently generated heterogeneous computational cores;
    matching the generated at least a signature respective of the multimedia content input to at least a signature from a Signature Database;
    identifying a cluster respective of the generated at least a signature; and
    identifying in a Concept Database (CDB) a concept respective of the cluster, wherein the concept includes a collection of signatures, each signature representing a multimedia content input, and metadata describing the concept; and
    characterizing the multimedia content input based in part on metadata describing the at least one identified concept.

* * * * *